United States Patent
Gundavelli et al.

(10) Patent No.: US 12,302,215 B2
(45) Date of Patent: May 13, 2025

(54) SYSTEMS AND METHODS FOR SUPPORTING LOCALIZED SERVICES USING A MULTI-OPERATOR USER EQUIPMENT ROUTE SELECTION POLICY

(71) Applicant: Cisco Technology, Inc., San Jose, CA (US)

(72) Inventors: Sri Gundavelli, San Jose, CA (US); Vimal Srivastava, Bangalore (IN); Ravi Kiran Guntupalli, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 345 days.

(21) Appl. No.: 17/819,282

(22) Filed: Aug. 11, 2022

(65) Prior Publication Data
US 2024/0049106 A1 Feb. 8, 2024

Related U.S. Application Data

(60) Provisional application No. 63/370,401, filed on Aug. 4, 2022.

(51) Int. Cl.
| | |
|---|---|
| *H04W 8/04* | (2009.01) |
| *H04W 8/26* | (2009.01) |
| *H04W 12/06* | (2021.01) |
| *H04W 40/18* | (2009.01) |
| *H04W 60/00* | (2009.01) |
| *H04W 60/04* | (2009.01) |

(52) U.S. Cl.
CPC ........... *H04W 40/18* (2013.01); *H04W 60/04* (2013.01)

(58) Field of Classification Search
CPC .............................. H04W 40/18; H04W 60/04
USPC ....................................................... 455/435.1
See application file for complete search history.

(56) References Cited

U.S. PATENT DOCUMENTS

| | | |
|---|---|---|
| 2020/0314718 A1 | 10/2020 | Buyukdura et al. |
| 2021/0258868 A1 | 8/2021 | Wong et al. |
| 2022/0007441 A1 | 1/2022 | Bharatia et al. |

(Continued)

FOREIGN PATENT DOCUMENTS

| | | | |
|---|---|---|---|
| CN | 111580996 | 8/2020 | |
| WO | WO-2022034015 A1 * | 2/2022 | ............ H04W 48/18 |
| WO | 2022094068 A1 | 5/2022 | |

OTHER PUBLICATIONS

IP.com (Year: 2024).*

(Continued)

*Primary Examiner* — Moustapha Diaby
(74) *Attorney, Agent, or Firm* — Polsinelli P.C.

(57) ABSTRACT

Disclosed are a system and method for updating a user equipment route selection policy. The method includes receiving, at a home network in communication with a user equipment, an indication that a user of the user equipment desires to connect to a standalone non-public network for an event, receiving service hosting information for the event, revising a user equipment route selection policy at the home network based on the service hosting information to yield an updated user equipment route selection policy and transmitting the updated user equipment route selection policy to the user equipment. The user equipment registers, based on the updated user equipment route selection policy, with the standalone non-public network for the event.

22 Claims, 8 Drawing Sheets

(56) References Cited

U.S. PATENT DOCUMENTS

2023/0397147 A1* 12/2023 Kawasaki ............. H04W 60/04
2024/0244502 A1*  7/2024 Kumar ................. H04W 40/24

OTHER PUBLICATIONS

ProQuest (Year: 2024).*
IP.com search history (Year: 2024).*
ProQuest search history (Year: 2024).*

* cited by examiner

```
┌─────────────────────────────────────────────┐
│ TRANSMITTING SERVICE HOSTING INFORMATION FROM│
│ A STANDALONE NON-PUBLIC NETWORK AND TO A HOME│
│ NETWORK IN COMMUNICATION WITH A USER EQUIPMENT│
│ FOR AN EVENT, WHEREIN THE TRANSMITTING OF THE│
│ SERVICE HOSTING INFORMATION IS BASED ON AN   │
│ INDICATION THAT A USER OF THE USER EQUIPMENT DESIRES│—342
│ TO CONNECT TO THE STANDALONE NON-PUBLIC NETWORK│
│ FOR AN EVENT AND WHEREIN THE HOME NETWORK REVISES│
│ A USER EQUIPMENT ROUTE SELECTION POLICY BASED ON│
│ THE SERVICE HOSTING INFORMATION TO YIELD AN UPDATED│
│ USER EQUIPMENT ROUTE SELECTION POLICY AND TRANSMITS│
│ THE UPDATED USER EQUIPMENT ROUTE SELECTION POLICY│
│ TO THE USER EQUIPMENT                        │
└─────────────────────────────────────────────┘
                      ↓
┌─────────────────────────────────────────────┐
│ RECEIVING, BASED ON THE UPDATED USER EQUIPMENT│
│ ROUTE SELECTION POLICY, A REGISTRATION OF THE USER│—344
│ EQUIPMENT WITH THE STANDALONE NON-PUBLIC NETWORK│
│ FOR THE EVENT                                │
└─────────────────────────────────────────────┘
                      ↓
┌─────────────────────────────────────────────┐
│ PROVIDING ACCESS TO THE EVENT TO THE USER EQUIPMENT│—346
│ ACCORDING TO THE UPDATED USER EQUIPMENT ROUTE│
│ SELECTION POLICY                             │
└─────────────────────────────────────────────┘
```

FIG. 5

SYSTEMS AND METHODS FOR SUPPORTING LOCALIZED SERVICES USING A MULTI-OPERATOR USER EQUIPMENT ROUTE SELECTION POLICY

CROSS-REFERENCE TO RELATED APPLICATIONS

This application claims the benefit of U.S. Provisional Patent Application No. 63/370,401, filed on Aug. 4, 2022, entitled "SYSTEMS AND METHODS FOR SUPPORTING LOCALIZED SERVICES USING A MULTI-OPERATOR USER EQUIPMENT ROUTE SELECTION POLICY," which is expressly incorporated by reference herein in its entirety.

TECHNICAL FIELD

This disclosure relates generally to enabling user devices access to localized services and more specifically to changes to the user equipment (UE) route selection policy in a 3GPP 5G or similar system architecture which enable the user device to access local services.

BACKGROUND

In the 3GPP 5G framework, a user equipment (UE) route selection policy (URSP) is a policy element which allows the UE to make the determination on how the application traffic is to be routed. For example, a user might be on their UE watching a movie using an application or watching a YouTube video via a YouTube application. The data associated with movie or video is routed to the UE from a source of the data via reference to the URSP. The URSP is a policy element that the 5G system delivers to the UE after its registration to the 5G network. The URSP has two key components. First, it includes a traffic descriptor and second, the policy includes a route selection descriptor. The traffic descriptor is simply a selector which allows the UE to identify the traffic of interest. The route descriptor is a policy rule for binding the selected traffic to service identifiers in the 5G network. These rules bind the identified traffic (using the traffic descriptor) with forwarding/binding rules which are present in the route selection descriptor.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The current structure and the semantics of the user equipment (UE) route selection policy (URSP) makes the usage scope of this element limited to the public land mobile network (PLMN Id) delivering the policy. The URSP policy definition is evolving with richer semantics with many new elements making it into the policy.

In the current art, a UE-PCF (policy control function) delivers the URSP policy to the UE using the MANAGE UE POLICY COMMAND message. The UE as part of its registration to the network provides the supported operating system (OS) version over the LTE STATE INDICATION message. The UE-PCF can generate a URSP policy specific to the UE's OS version and in consideration with the UE's subscription policy.

The UE, when attached to the home PLMN (e.g., PLMN Id-1), obtains the URSP and the application binding is always to service elements within that home PLMN Id. There are use cases, however, where the home PLMN Id wants the UE to use a given standalone non-public network (SNPN) at a given location for accessing localized services. For example, assume there is a soccer match that is broadcasted in a SNPN deployed at stadium premises where the UE is currently located. The SNPN can coordinate with a content provider that provides the soccer match content. The local operator of the SNPN/content provider of that event may have a business relationship with the home PLMN Id, allowing the home PLMN Id to advertise the event and enable the UE to sign-up for the event via the home PLMN Id. In this case, access to the SNPN via the UE can be possible just for that application. Facilitation of this access by the UE can be achieved by the home PLMN Id and can include the discovery of the SNPN, UE on-boarding to the SNPN (possibly using OR constructs, or other approaches) and the use of the SNPN for that event, for that specific application and at a specific time.

The processes or methods can be practiced by different components of a network. For example, one method may be the steps that are performed by the home PLMN. A method in this regard can include one or more of receiving, at a home network in communication with a user equipment, an indication that a user of the user equipment desires to connect to a standalone non-public network for an event, receiving service hosting information for the event, revising a user equipment route selection policy at the home network based on the service hosting information to yield an updated user equipment route selection policy and transmitting the updated user equipment route selection policy to the user equipment. The user equipment registers, based on the updated user equipment route selection policy, with the standalone non-public network for the event.

In one aspect, the home network or home PLMN can include a processor and a computer-readable storage device. The computer-readable storage device stores instructions which, when executed by the processor, cause the processor to perform operations including receiving, at the home network in communication with a user equipment, an indication that a user of the user equipment desires to connect to a standalone non-public network for an event, receiving service hosting information for the event, revising a user equipment route selection policy at the home network based on the service hosting information to yield an updated user equipment route selection policy and transmitting the updated user equipment route selection policy to the user equipment. The user equipment can register, based on the updated user equipment route selection policy, with the standalone non-public network for the event.

In another aspect, a method can be performed by the UE or a mobile device that interacts with one or more of the home PLMN or the SNPN. A method in this regard can include one or more of transmitting, to a home network in communication with a user equipment or mobile device, an indication that a user of the user equipment desires to connect to a standalone non-public network for an event, wherein the home equipment receives service hosting information for the event and revises a user equipment route selection policy at the home network based on the service hosting information to yield an updated user equipment route selection policy, receiving the updated user equipment route selection policy at the user equipment and registering, based on the updated user equipment route selection policy, the user equipment with standalone non-public network for the event.

Another embodiment can include a UE or a mobile device that includes a processor and a computer-readable storage device. The computer-readable storage device stores instructions which, when executed by the processor, cause the processor to perform operations including transmitting, to a home network in communication with the UE or mobile device, an indication that a user of the UE or mobile device desires to connect to a standalone non-public network for an event, wherein the home equipment receives service hosting information for the event and revises a route selection policy at the home network based on the service hosting information to yield an updated route selection policy, receiving the updated route selection policy at the UE or mobile device and registering, based on the updated route selection policy, the UE or mobile device with standalone non-public network for the event.

Yet another method can cover steps that are performed by the SNPN. A method in this regard can include one or more of transmitting service hosting information from a standalone non-public network and to a home network in communication with a user equipment for an event, wherein the transmitting of the service hosting information is based on an indication that a user of the user equipment desires to connect to the standalone non-public network for the event and wherein the home network revises a user equipment route selection policy based on the service hosting information to yield an updated user equipment route selection policy and transmits the updated user equipment route selection policy to the user equipment, receiving, based on the updated user equipment route selection policy, a registration of the user equipment with the standalone non-public network for the event and providing access to the event to the user equipment according to the updated user equipment route selection policy.

In yet another aspect, the SNPN can include a processor and a computer-readable storage device. The computer-readable storage device can store instructions which, when executed by the processor, cause the processor to perform operations including transmitting service hosting information from the standalone non-public network and to a home network in communication with a user equipment for an event, wherein the transmitting of the service hosting information is based on an indication that a user of the user equipment desires to connect to the standalone non-public network for the event and wherein the home network revises a user equipment route selection policy based on the service hosting information to yield an updated user equipment route selection policy and transmits the updated user equipment route selection policy to the user equipment, receiving, based on the updated user equipment route selection policy, a registration of the user equipment with the standalone non-public network for the event and providing access to the event to the user equipment according to the updated user equipment route selection policy.

Description of Example Embodiments

Figure 1:
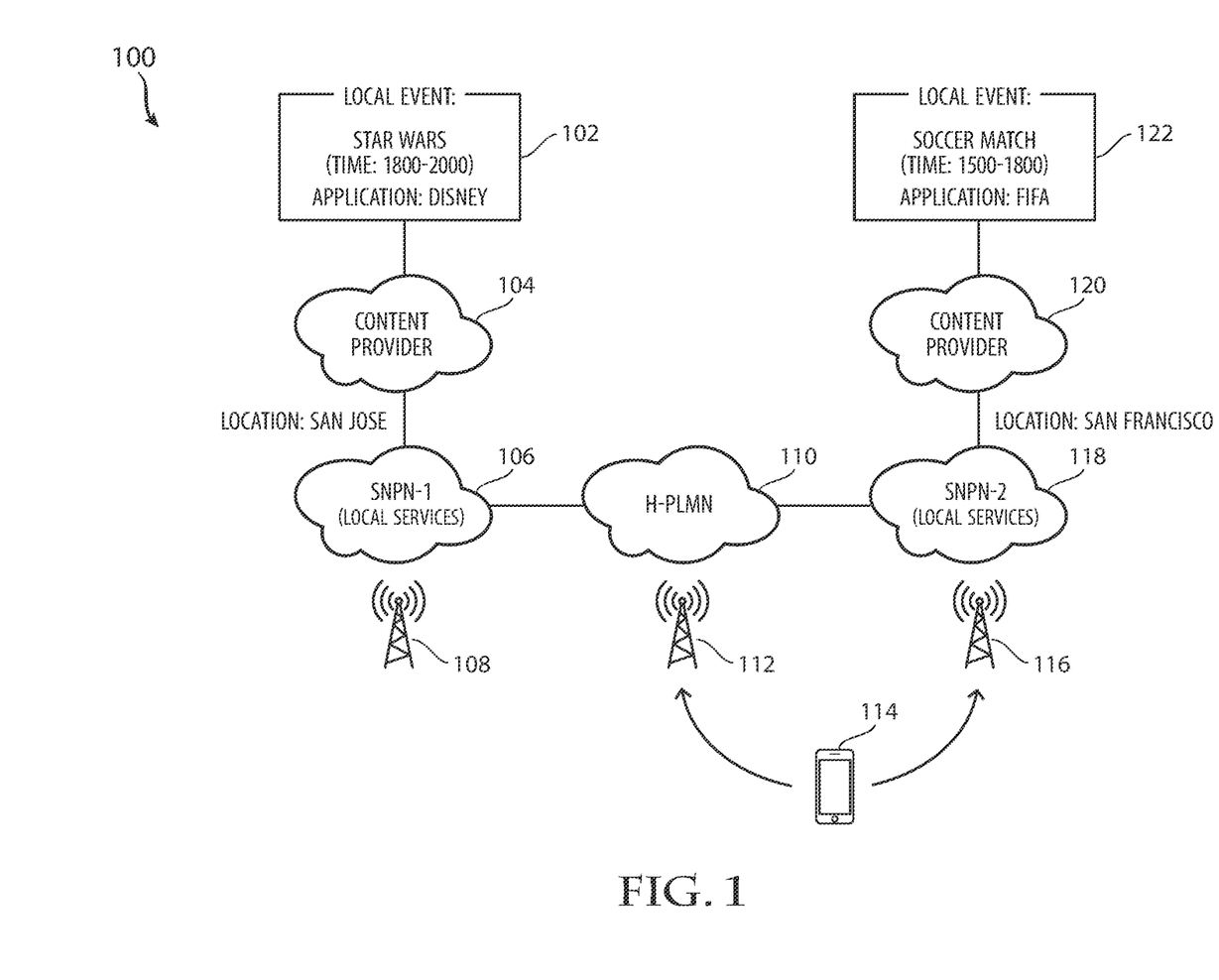
FIG. 1 illustrates a block diagram of an example infrastructure with two standalone non-public networks and a public land mobile network according to some examples.

Disclosed herein are systems, methods, and computer-readable media for innovations which focus on enabling a user equipment (UE) access to a localized event via a separate network than a currently connected network. FIG. 1 illustrates the infrastructure 100 or context of this disclosure. Assume that a UE 114 is communicating with a home PLMN (H-PLMN) 110. As noted above, the UE route selection policy (URSP) can include data such as applications used on the UE 114 like application-1 and application-2 and a default network H-PLMN 110. In one aspect the URSP may be just called a route selection policy. The UE 114 can represent any mobile device that is configured to communicate via a wireless protocol with the H-PLMN 110.

As shown in FIG. 1, there are two standalone non-public networks (SNPN-1 106 and SNPN-2 118) which are associated with a respective content provider 104, 120. The location of the SNPN-1 106 is in San Jose, California and the location of the SNPN-2 is in San Francisco. SNPN-1 106 provides access to a local event 102 which can be the presentation of the movie Star Wars via a "Disney+" application 102 at a given time. A local base station or access point 108 can be used for the UE 114 to access the SNPN-1 106 using any wireless protocol. At San Francisco, a soccer match can be offered at a certain time via a FIFA (International Federation of Association Football or Federation Internationale de Football Association) application 122 through the SNPN-2 118. A local base station or access point 116 can be provided for local users to access the SNPN-2 118.

Assume that the UE 114 is communicating via some wireless protocol such as, for example, 4G or 5G with a base station 112 associated with the H-PLMN 110. If the UE 114 is to connect to the local services SNPN-1 106 or SNPN-2 118, a simple steering of the UE 114 to a respective SNPN is not an option. The SNPN-1 106 or SNPN-2 118 will not be able to provide any other services other than the event content. In other words, the UE 114 may connect to the to SNPN-1 106 or SNPN-2 11 to watch the movie or the match but other services such as cellular calling, email, texting, Internet access, etc. will not be available. A user may desire to start another application on their device but any network-based services for that application simply will not be available. What is required is the ability for the home network H-PLMN 110 to equip the UE 114 with the rules or data needed for using a respective SNPN 106/118 for one or more of a specific application, a specific time, and/or a specific location. In this manner, the UE 114 does not have to disconnect from the H-PLMN 110 in order to connect to the local network.

To achieve this goal, the URSP rules can be extended to include the network identifiers and transform the URSP into a multi-operator URSP. In the example in FIG. 1, the URSP rules can be modified to include the data for SNPN-1 106 such as the application is the "Star Wars" application, the network is SNPN-1 and a dual connection (DC) flag can be set to false, which means that the UE 114 is not to connect both to the SNPN-1 106 and the H-PLMN 110 simultaneously. In another example, the URSP may be modified to include data such as the application is the FIFA application, the network is SNPN-2 and the DC-flag is set to "true" meaning the UE 114 is enabled to communicate with both the H-PLMN 110 and the SNPN-2 118 simultaneously. In such a case, then the appropriate wireless protocols, spectrum used, and so forth will be implemented such that there is no technical conflict with a dual communication mode. In one example, the connection with the H-PLMN 110 and the UE 114 might be through a cellular protocol like 4G or 5G and the connection to the SNPN-2 118 might be through the WiFi 802.11 family of wireless protocols. In generally, the approach can include using different wireless protocols for the different connected networks in a dual communication mode. In other aspects, the same wireless protocol might be used but different beam forming techniques could be used to direct the signal energy towards the respective network base station or access point. Then, the approach can include activation of an application that should result in performing a network-attach/dual-attach to the target network SNPN-2 118 and activating a protocol data unit (PDU) session on the network(s).

The UE 114 may or may not be capable of dual-connectivity, but the provided rules can allow the UE 114 to use the SNPN 106/118 only for the duration of the event 102/122 and revert back to the home network H-PLMN 110 when the event ends.

This disclosure provides enhancements to the URSP structure for binding applications to SNPNs 106/118 based on one or more of a location, a time and/or an application and with dual-connectivity considerations. A given UE 114 may, on its own without any coordination with the home network 110, be able to learn about the event 102/122, download the eSIM (electronic subscriber identification module) credentials of the SNPN 106/118, on-board to the SNPN hosting the event 102/122 and be able to watch the event or otherwise participate in the event. In this approach, the home network H-PLMN 110 is not part of the process. This disclosure further enables the home network H-PLMN 110 to monetize on local events 102/122 by facilitating the on-boarding of the UE 114 to the proper SNPN 106/118 using the existing home credentials. Disclosed are application binding rules that can include the network identifiers and the application binding policies. The focus of this disclosure is how to bind applications to SNPNs 106/118 based on one or more of a location of a UE 114, a time, and/or an application and can include dual-connectivity considerations or flag settings.

The disclosed approach includes details of the local network 106/118 hosting the localized service to the UE 114 by including the local host network details in the URSP rules. A UE 114 may have multiple URSP rules which bind different applications to different networks hosting the service. The SNPN 106/118 hosting the service and the content provider 104, 120 can be the same, may be different or may have some agreement in place for enabling the dual connectivity disclosed herein. It is assumed that the content provider 104, 120 has some knowledge of the slice and host network 110 details (e.g., SNPN, network ID (NID), etc). A "slice"" in the context of a wireless protocol such as 5G involves a network configuration that allows multiple networks to be created on one physical common infrastructure. Thus, a slice can be a virtual and independent network on the physical infrastructure that the UE 114 and/or the content provider 104/120 would be assigned to use.

The SNPN 106/118 or the content provider 104/120 can have an agreement with the home network H-PLMN 110 of the UE 114. The home network H-PLMN 110 can provide the event details to the UE 114 via a short message service (SMS), email or some other mechanism to enable the user of the UE 114 to sign up for the event 102/122. The SNPN 106/118 provides the hosting network 110 one or more of discovery details, slice information which relates to an isolated end-to-end network tailored to fulfil a specific requirement, a data network name (DNN), an event duration, an even location, an event date & time, etc., to the home operator 110.

Figure 2:
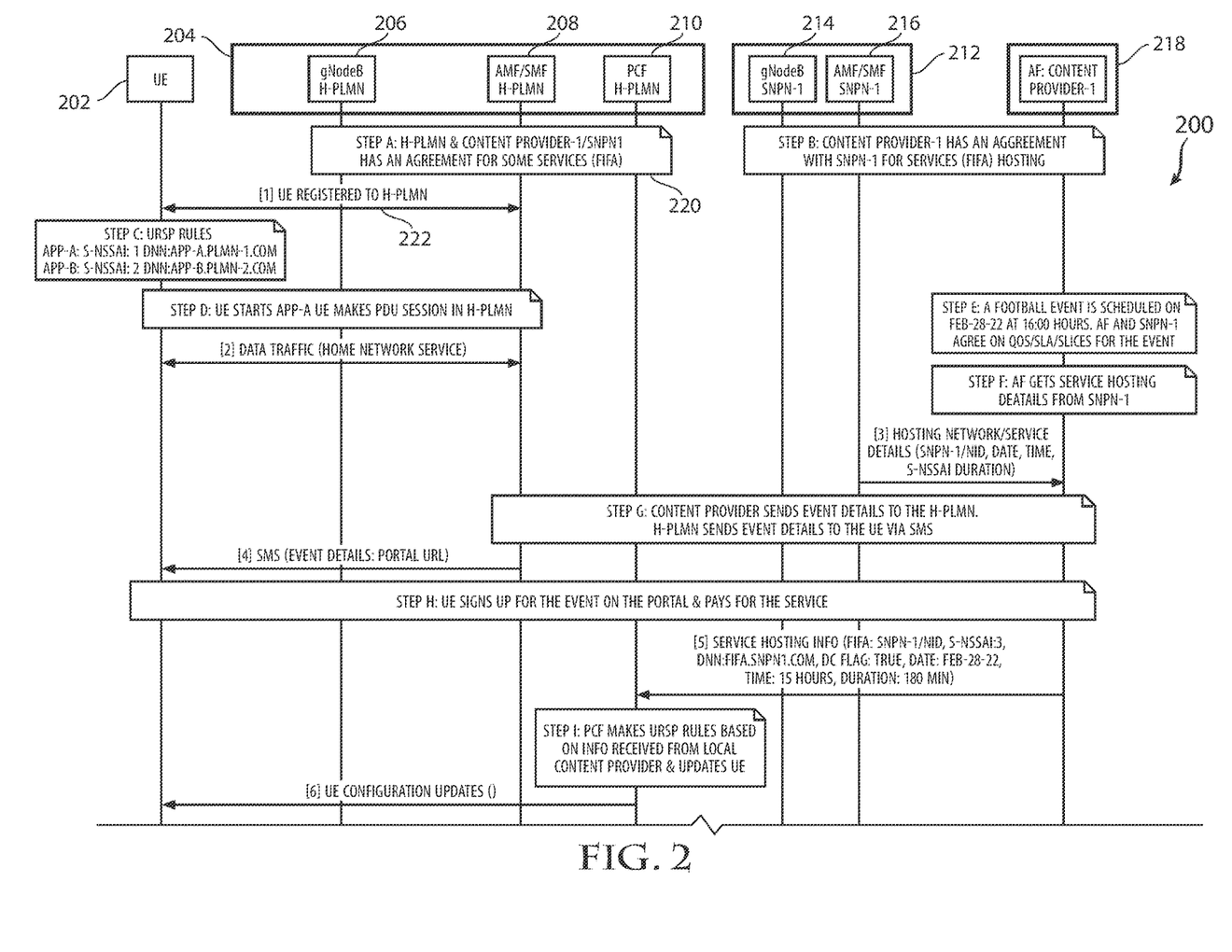
FIG. 2 illustrates a flow diagram of the various steps to establish a connection with the user equipment with the localized services according to some examples.

FIG. 2 illustrates a call flow 200 that provides in more detail the specific steps between the UE 202 and other components based on the innovations disclosed herein. The UE 202 can correspond to the UE 114 of FIG. 1. The H-PLMN 204 of FIG. 2 can correspond to the home network 110 of FIG. 1. The H-PLMN 204 can include a gNodeB H-PLMN 206, which can be a 3GPP-compliant implementation of a 5G-NR (new radio) base station. The gNodeB H-PLMN 206 allows the UE 202 to connect with the 5G NG (next generation) core network using the 5G NR air interface as is known in the art. The gNodeB H-PLMN 206 provides a 5G NR user plane and control plane terminations towards the UE 202. It connects with the 5G NG-Core via an NG interface.

The H-PLMN 204 also can include an AMF/SMF H-PLMN 208, which stands for an access and mobility management function (AMF) and/or a session management function (SMF) which can handle anything to do with connection and mobility management. A first local service network 212 can include a SNPN-1 gNodeB 214 and an AMF/SMF SNPN-1 216. The particular protocol for these base stations and functions for managing the connectivity of UE's 202 can vary and are not limited to 4G, 5G or any specific wireless cellular or non-cellular protocol. A content provider can be an AF: content-provider-1 218 and can provide or manage the delivery of content to the UE 202. AF in this case stands for "application function." The various communications between components disclosed herein can occur between components such as the UE 202, an AMF/SMF 208 or an AF 218 associated with a respective component.

As shown in FIG. 2, there are a series of lettered steps from step A to step K and corresponding numbered steps from step [1] to step [16]. This disclosure will work through each of these various steps with reference to FIG. 2.

Based on an information policy control function (PCF) 210) in a home network 204, the home network 204 constructs the URSP rules that can be provided to the UE 202. Below are example rules associated with a URSP: (1) App=Disney+, Network=SNPN-1/NID, S-NSSAI=1, DNN=app-c.snpn-1.com Duration=2 Hours, W3C-Time=2022-02-16T19, DC=False; (2) App=FIFA, Network=SNPN-2/NID, S-NSSAI=2, DNN=app-c.snpn-2.com Duration=2 Hours, W3C-Time=2022-02-16T18, DC=True. Note that S-NSSAI=1 stands for network slice selection assistance information. The "App" or application can be Disney+ in one example or FIFA (Federation Internationale de Football Association) or any other application used to access content or to perform some other function.

Based on the URSP, when the user of the UE 202 starts an application such as the Disney+ App, while the UE 202 is at the event location and at the date/time, the UE 202 will connect to the SNPN 212 based on information given in the URSP on a second radio, when UE 202 is dual radio enabled for dual connectivity 224. A non-dual connectivity-enabled UE 202 will disconnect from the home network PLMN 204 and connect to the local service host network 212 to access the service. This mode is represented as feature 226 in FIG. 2. The UE 202 will disconnect from the SNPN 212 after the event duration is over in the case of a non-dc enabled UE 202 or when the UE 202 exits the chosen application.

The call flow 200 can include one or more steps which can be illustrated in the following flow. In step A, the H-PLMN 204 and content provider/SNPN-1 218/212 can have an agreement for some services such as providing access to a FIFA or Disney+ application. Step B can include the content provider-1 218 having an agreement with the SNPN-1 212 for services hosting. Note that the content provider 218 and the SNPN-1 212 can be the same entity or a different entity.

Step [1] can include the UE 202 registering with the H-PLMN 204. Step C can include establishing URSP rules such as for App-a: S-NSSAI:1 dnn:app-a.plmn-1.com and for App-b: S-NSSAI:2 dnn:app-b.plmn-2.com. These rules can relate to data such as network slice selection assistance information and data network name for the respective application and the PLMN to use for the UE 202.

Step D can include the UE 202 starting or the user of the UE 202 opening an application (App-A) and establishing a protocol data unit (PDU) session in the H-PLMN 204. The PDU session involves providing an end-to-end user plane connectivity between the UE 202 and a specific data network 212 through a user plane function. The PDU session enables data flow to occur between devices.

Step [2] can include data traffic being exchanged between the UE 202 and the H-PLMN 204. This can occur on a first radio component on the UE 202. Note that below, where a dual connectivity flag is enabled, the UE 202 can include a second radio for simultaneous communication with a second network such as the SNPN-1 212. Step E can involve an event such as a football event being scheduled on February-28-22 at 16:00 Hours. The AF/content provider 218 and the SNPN-1 212 can agree on such features for the event as a quality of service (QoS), a service level agreement (SLA) and technical slices for the event. Step F can include the AF of the content provider 218 getting service hosting details from the SNPN-1 212 (e.g., more specifically the AMF/SMF SNPN-1 216) such as, as shown in step [3], the name of the local network 212, a network identifier, a date, a time a duration and the S-NSSAI information. In step G, the content provider 218 sends the event details to the H-PLMN 204 and the H-PLMN 204 sends event details to the UE 202 via SMS or via some other messaging or communication protocol. The message can include a portal universal resource locator (URL) which can enable the user of the UE 202 to access the event and take the necessary steps to be approved to experience or view the event. In one example, the use of an Apple "App Clip" could be used which is a portion of a full application that is downloaded on the UE 202 and that provides some functionality associated with the application. Thus, the registration process could be handled through a browser and the URL or via an App Clip or downloaded application as well. This can include logging in, making a payment, confirming availability or other steps. In step H, the UE 202 signs up for the event on the portal or other means and pays for the service in one example. The service or event may also be free and the user just needs to register or provide an email address, by way of example.

Step [5] identifies example service hosting information such as: FIFA:SNPN-1/NID, S-NSSAI:3,\nDNN: fifa.snpn1.com,DC-Flag:true,Date:February-28-22,Time:15 Hours\nDuration: 180 Min. This data includes the various network identification information, data and time information, duration information and a setting for a DC (dual connectivity) flag as true, meaning that the UE 202 and/or the various network components can establish dual connectivity with the UE 202.

In step I, the PCF 210 makes or generates an update URSP rule based on the service hosting information received from the content provider 218 and updates the UE 202 as shown in step [6].

Step J includes an example listing of the state of the URSP rules after being updated. The example URSP rules can include, by way of example only: App-a: S-NSSAI:1 dnn: app-a.plmn-1.com; App-b: S-NSSAI:2 dnn:app-b.plmn-2.com; FIFA: SNPN-1: 24 S-NSSAI:3 dnn:fifa; snpn-1.com DC:True SanJose Date: February-28-22; Time:15:00 Hrs Duration:3 Hr. Step K can include where the UE 202 starts an application such as the FIFA application. Based on URSP policies, the UE 202 determines or chooses SNPN-1 as network, that the DC flag is enabled, that the UE 202 matches the location, date and time of the event and latches on to SNPN-1 212 on the second radio.

There are some optional settings or mode that are possible. In a DC enabled UE 202 224, a step [7] can include the UE 202 registering with the SNPN-1 212 on the second radio and a step [8] wherein the UE 202 establishes a PDU session with the SNPN-1 212. Then in step [9], data traffic is communicated between the UE 202 and the SNPN-1 212. Note in step [10], data is also transmitted between the SNPN-1 212 (e.g., more specifically the AMF/SMF SNPN-1 216) and the AF of the content provider 218. As part of this mode 224, when the event is over, the UE 202 exits the chosen application (FIFA in this example) and the UE 202 disconnects the PDU session and de-registers from the SNPN-1 212. Step [11] shows the PDE session release and the de-registration of the UE 202.

Another mode relates to the DC flag not being enabled 226. In this mode, the UE 202 will disconnect from the H-PLMN 204 and latch on to the SNPN-1 212 for service access. In step [12], the UE 202 registers with the SNPN-1 212 and the first radio or the primary radio. Step [13] involves the UE 202 establishing a PDU session and step [14] involves the flow of data traffic between the UE 202 and the SNPN-1 212. Step [15] illustrates data flow between the AF of the content provider 218 and the SNPN-1 212 (e.g., more specifically the AMF/SMF SNPN-1 216). When the duration of the event is over or the UE 202 exits the application, the UE 202 disconnects the PDU session and deregisters from eth SNPN-1 212. In step [16], the UE 202 registers on the H-PLMN 204 and access the home services again.

Figure 3A:
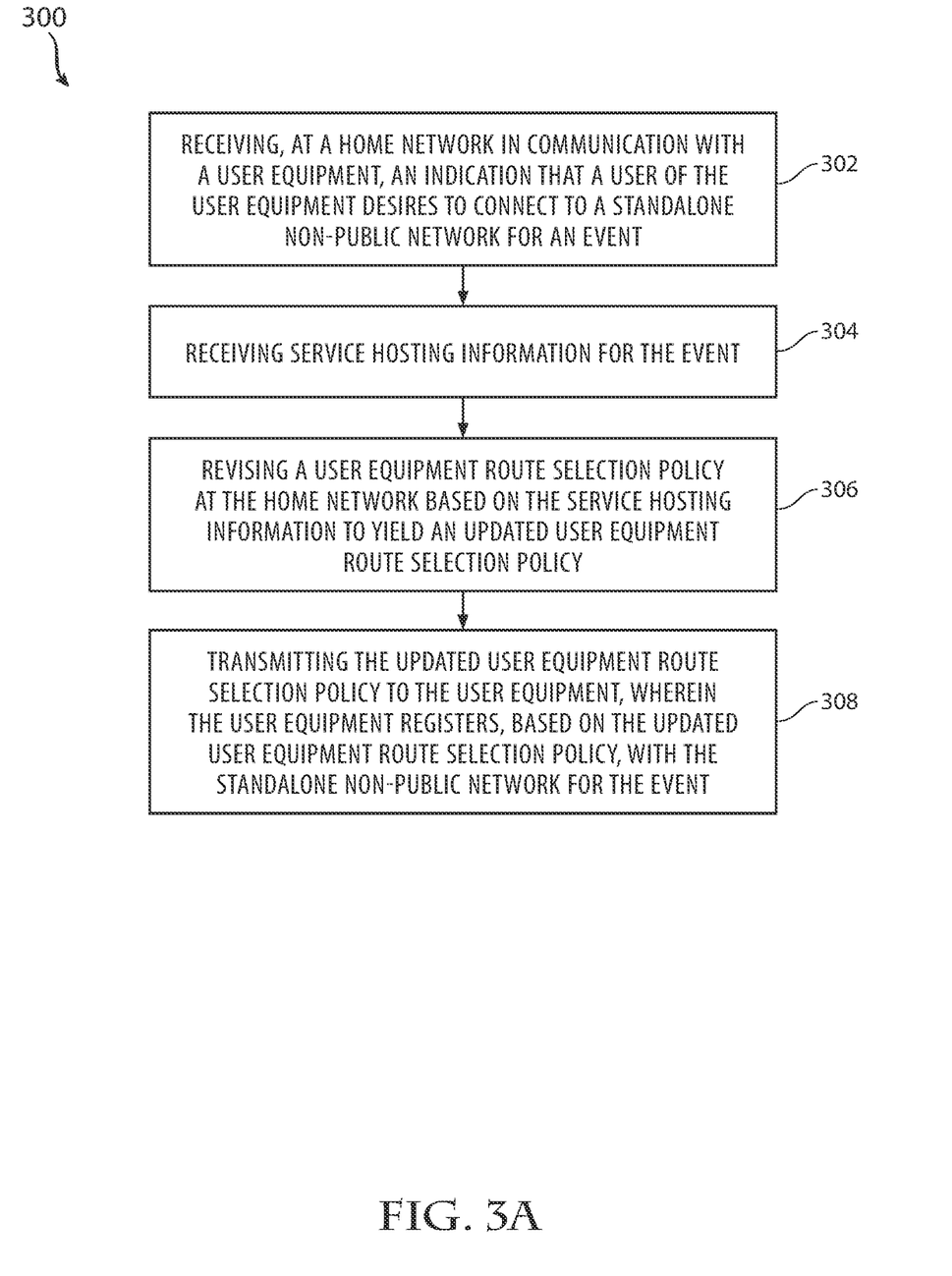
FIG. 3A-C illustrate various methods according to some examples of this disclosure.
Figure 3B:
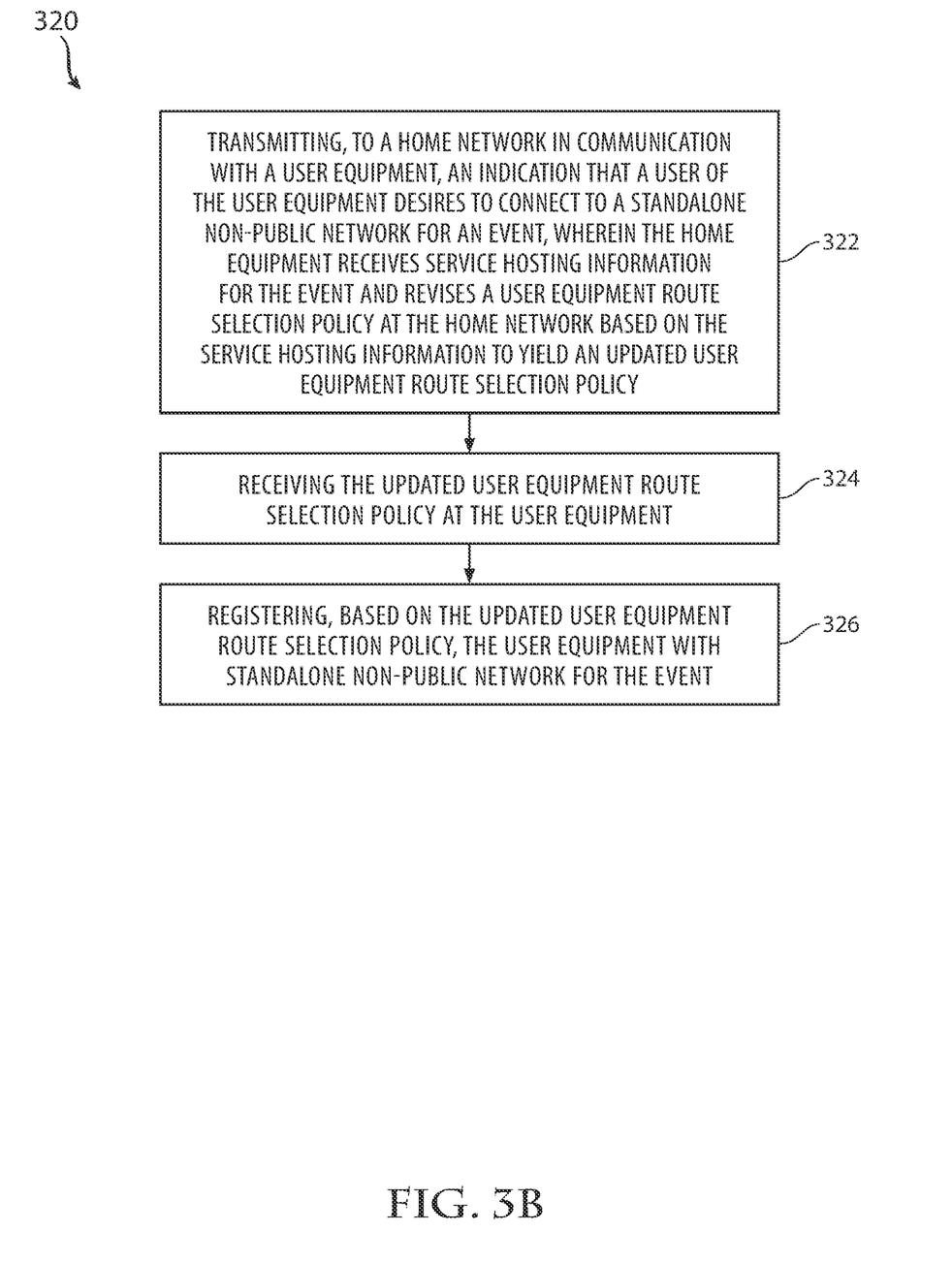
Figure 3C:
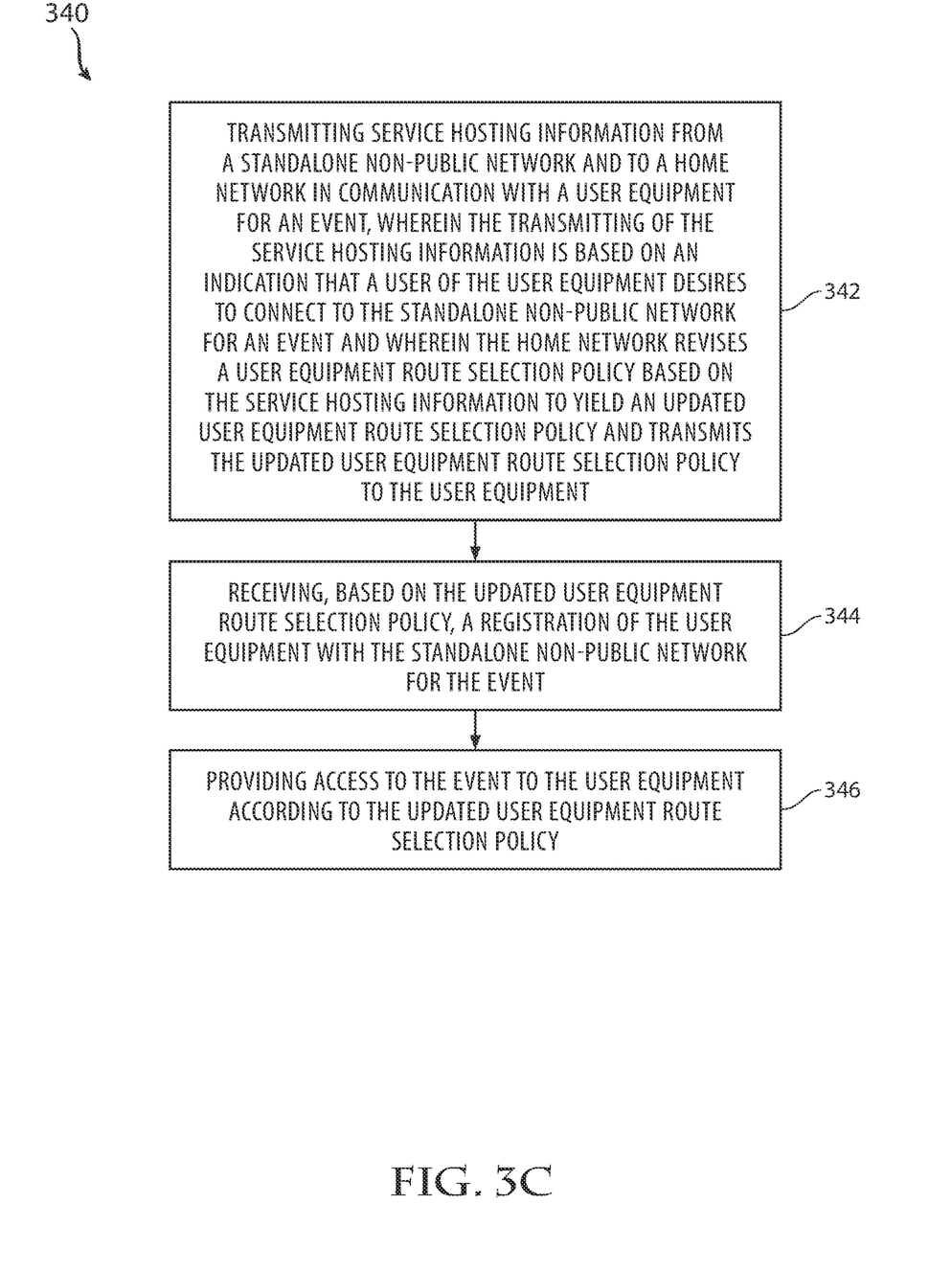

The processes disclosed herein can be performed by various components in the network shown in FIG. 1. For example, FIGS. 3A-3C illustrate individual processes or methods performed by the H-PLMN 110, the UE 114 or the SNPN 106/118. All these various processes generally relate to how the URSP rules are updated or modified to enable the UE 114 to access the SNPN 106/118 and participate in the local event 102/122. However, the processes look different from each different component in the network 100.

FIG. 3A illustrates a method 300 which covers a broader aspect of this disclosure. This method is practiced from the standpoint of the home network 110. The method 300 can include receiving, at a home network 110 in communication with a user equipment 114, an indication that a user of the user equipment 114 desires to connect to a standalone non-public network 106/118 for an event 102/122 (302), receiving service hosting information for the event 102/122 (304), revising a user equipment route selection policy at the home network 110 based on the service hosting information to yield an updated user equipment route selection policy (306) and transmitting the updated user equipment route selection policy to the user equipment 114. The user equipment 114 can register, based on the updated user equipment route selection policy, with the standalone non-public network 106/118 for the event 102/122 (308). The event 102/122 can include one or more of a location and a time frame. The user equipment 114 can register in one aspect with the standalone non-public network 106/118 only during the time frame of the event 102/122. In other aspects, the user equipment 114 can register with the standalone non-public network 106/118 for a predetermined fixed or dynamic period of time before or after the event for an extra fee or based on some other parameter such as an overtime situation or an after-event report.

The method further can include maintaining the communication with the user equipment 114 in a dual-connectivity mode and disconnecting with the user equipment 114 during the event 102/122 in a non-dual connectivity mode. The updated user equipment route selection policy can include a dual-connectivity flag indicating whether the user equipment 114 can simultaneously connect with the home network 110 and the standalone non-public network 106/118 during the event 102/122 or whether the user equipment 14 exclusively connects to the standalone non-public network 106/118 during the event 102/122. In order to make the process work, one aspect of this disclosure includes establishing an agreement between a content provider 104/120 associated with the standalone non-public network 106/118 and the home network 110.

In one aspect, the indication that the user of the user equipment 114 desires to connect to the standalone non-public network 106/118 for the event 102/122 can include the user initiating an application on the user equipment 114 associated with the event 102/122. After receiving the indication at the home network 110, the method can include receiving event details from a content provider 104/120 associated with the event 102/122 and transmitting the event details to the user equipment 114. Transmitting the event details to the user equipment 114 further can include transmitting a message to the user equipment 114. The message, such as an email or a short message service (SMS) text can enable the user to access a portal to enable the user to register or in some other fashion join the event 102/122. Other communication protocols or approaches could be used as well. For example, a URL can be provided that enables the user equipment 114 to access a graphical user interface from a network server which provides the interactivity necessary to register for the event 102/122, which can include paying for the event 102/122. After the user accesses the portal and registers for the event 102/122, the method can include receiving the service hosting information for the event 102/122. After transmitting the updated user equipment route selection policy to the user equipment 114, the user can start an application associated with the event 102/122 on the user equipment 114, which can cause the user equipment 114 to register with the standalone non-public network 106/118 for the event based on the updated user equipment route selection policy.

The user equipment 114 can register, based on the updated user equipment route selection policy, with the standalone non-public network 106/118 for the event 102/122 for one or more of a duration of time associated with the event, while the user equipment 114 is at a location associated with the event 102/122, for a period of time before and/or after the vent and/or while the user is using an application on the user equipment 114 associated with the event 102/122.

The home PLMN or a home network 110 can include one or more processors and a computer-readable medium storing instructions which, when executed by the processor, cause the processor to perform operations including receiving, at the home network 110 in communication with a user equipment 114, an indication that a user of the user equipment 114 desires to connect to a standalone non-public network 106/118 for an event 102/122, receiving service hosting information for the event 102/122, revising a user equipment route selection policy at the home network 110 based on the service hosting information to yield an updated user equipment route selection policy and transmitting the updated user equipment route selection policy to the user equipment 114. The user equipment 114 can then register, based on the updated user equipment route selection policy, with the standalone non-public network 106/118 for the event 102/122.

FIG. 3B illustrates another method 320 which can be performed by the user equipment 114. The method 320 can include transmitting, to a home network 110 in communication with a user equipment 114, an indication that a user of the user equipment 114 desires to connect to a standalone non-public network 106/118 for an event 102/122, wherein the home equipment 110 receives service hosting information for the event 10/122 and revises a user equipment route selection policy at the home network 110 based on the service hosting information to yield an updated user equipment route selection policy (322), receiving the updated user equipment route selection policy at the user equipment 114 (324) and registering, based on the updated user equipment route selection policy, the user equipment 114 with standalone non-public network 106/118 for the event 102/122 (326).

The user equipment 114 can register, based on the updated user equipment route selection policy, with the standalone non-public network 106/118 for the event for one or more of a duration of time associated with the event, while the user equipment 114 is at a location associated with the event 102/122 and/or while the user is using an application on the user equipment associated with the event 102/122. The registering, based on the updated user equipment route selection policy, of the user equipment 114 with standalone non-public network 106/118 for the event 102/122 can occur in a dual-connectivity mode in which the user equipment 114 maintains a connection with the home network 110 during the event or a non-dual-connectivity mode in which the user equipment 114 does not maintain a connection with the home network 110 during the event. After the event 102/122, the method can include deregistering the user equipment from the standalone non-public network 106/118.

Another embodiment can be the UE 114 itself, which can be a mobile device. A mobile device in this regard can include a processor and a computer-readable storage device, storing instructions which, when executed by the processor, cause the processor to perform operations. The operations can include transmitting, to a home network 110 in communication with the mobile device 114, an indication that a user of the mobile device desires to connect to a standalone non-public network 106/118 for an event 102/122, wherein the home equipment 110 receives service hosting information for the event and revises a route selection policy at the home network 110 based on the service hosting information to yield an updated route selection policy, receiving the updated route selection policy at the mobile device 114 and registering, based on the updated route selection policy, the mobile device 14 with standalone non-public network 106/118 for the event 102/122.

FIG. 3C illustrates another method 340 which can be performed by the SNPN 106/118. The method 340 can include transmitting service hosting information from a standalone non-public network and to a home network in communication with a user equipment 114 for an event 102/122, wherein the transmitting of the service hosting information is based on an indication that a user of the user equipment 114 desires to connect to the standalone non-public network 106/118 for the event 102/122 and wherein the home network revises a user equipment route selection policy based on the service hosting information to yield an updated user equipment route selection policy and transmits the updated user equipment route selection policy to the user equipment 114 (342), receiving, based on the updated user equipment route selection policy, a registration of the user equipment 114 with the standalone non-public network 106/118 for the event 102/122 (344) and providing access to the event 102/122 to the user equipment 114 according to the updated user equipment route selection policy (346).

Providing the access to the event 102/122 can occur based on one or more of while the user is using an application on the user equipment 114 associated with the event 102/122, for a time frame associated with the event 102/122 and based on a location of the user equipment 114 in connection with the event 102/122.

Providing access to the event 102/122 to the user equipment 114 according to the updated user equipment route selection policy can further occur in a dual-connectivity mode in which the user equipment 114 maintains a connection with the home network 110 during the event 102/122 or a non-dual-connectivity mode in which the user equipment 114 does not maintain a connection with the home network 110 during the event 102/122. The method can include deregistering the user equipment 114 after the event 102/122.

In yet another aspect, the SNPN 106/118 can include a processor and a computer-readable storage device. The computer-readable storage device can store instructions which, when executed by the processor, cause the processor to perform operations including transmitting service hosting information from the standalone non-public network 106/118 and to a home network 110 in communication with a user equipment 114 for an event 102/122, wherein the transmitting of the service hosting information is based on an indication that a user of the user equipment 114 desires to connect to the standalone non-public network 106/118 for the event 102/122. The home network 110 can revise a user equipment route selection policy based on the service hosting information to yield an updated user equipment route selection policy and transmits the updated user equipment route selection policy to the user equipment 114. The operations further can include receiving, based on the updated user equipment route selection policy, a registration of the user equipment 114 with the standalone non-public network 106/118 for the event 102/122 and providing access to the event 102/122 to the user equipment according to the updated user equipment route selection policy.

Figure 4:
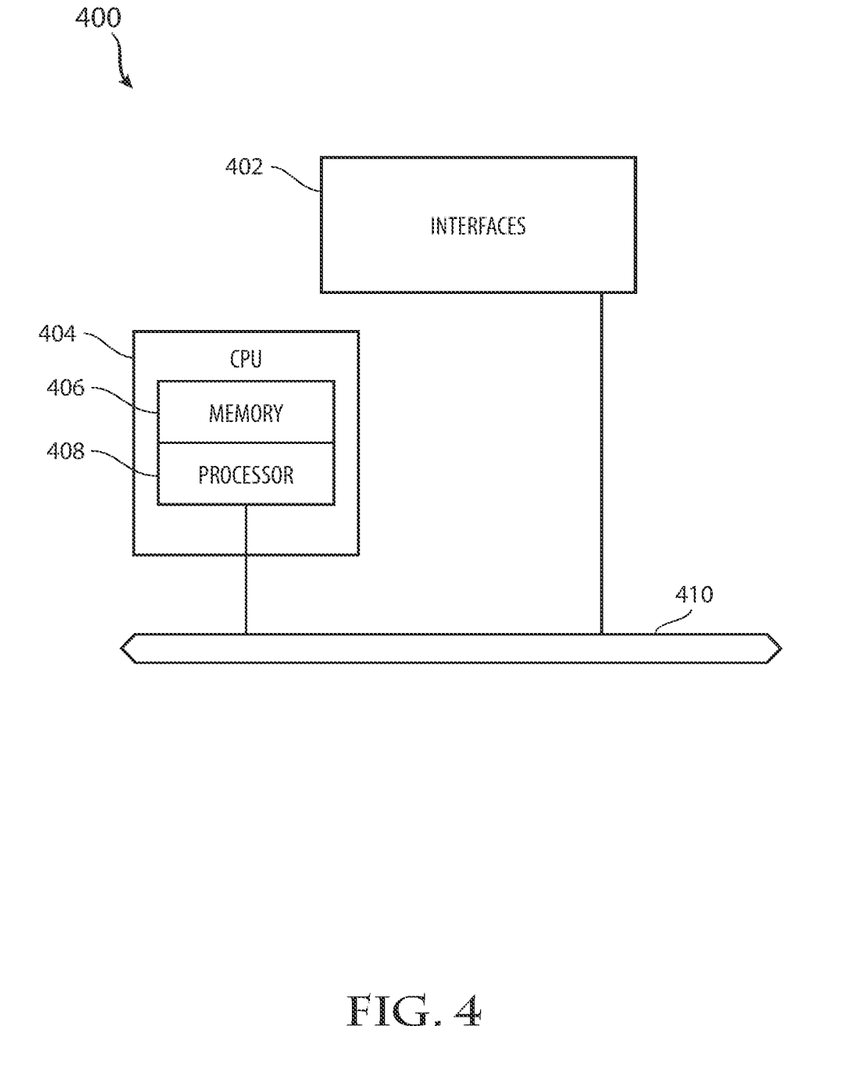
FIG. 4 illustrates an example network device in accordance with various examples.

FIG. 4 illustrates an example network device 400 suitable for implementing aspects of this disclosure. The network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. The CPU 404 may include one or more processors 408, such as a processor from the INTEL x86 family of microprocessors. In some cases, processor 408 can be specially designed hardware for controlling the operations of the network device 400. In some cases, a memory 406 (e.g., non-volatile RAM, ROM, etc.) also forms part of the CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the CPU 404 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 406 could also hold various software containers and virtualized execution environments and data.

The network device 400 can also include an application-specific integrated circuit (ASIC), which can be configured to perform routing and/or switching operations. The ASIC can communicate with other components in the network device 400 via the connection 410, to exchange data and signals and coordinate various types of operations by the network device 400, such as routing, switching, and/or data storage operations, for example.

Figure 5:
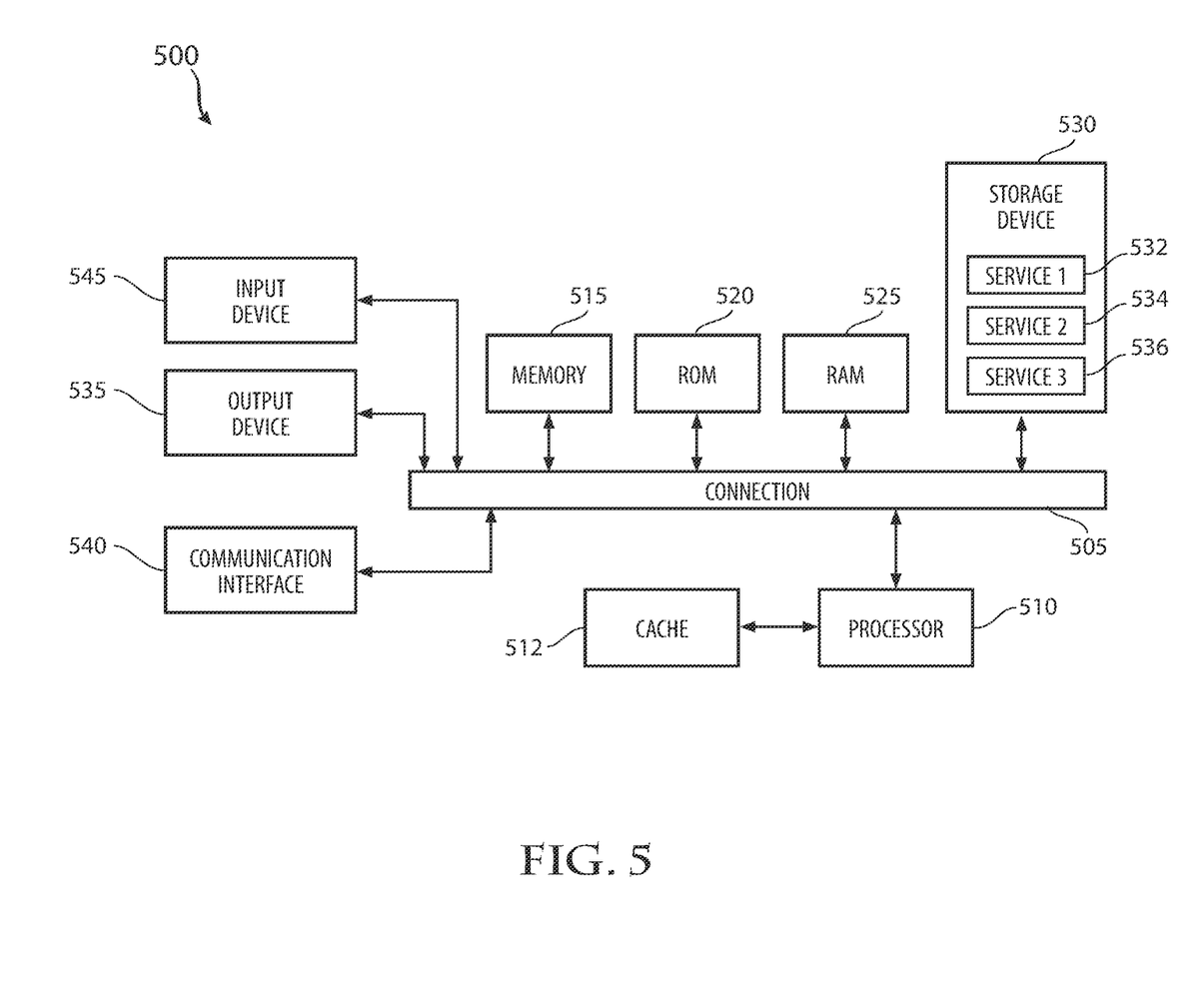
FIG. 5 illustrates an example computing device architecture, in accordance with some examples.

FIG. 5 illustrates an example computing device architecture 500 of an example computing device which can implement the various techniques described herein. The components of the computing device architecture 500 are shown in electrical communication with each other using a connection 505, such as a bus. The example computing device architecture 500 includes a processing unit (CPU or processor) 510 and a computing device connection 505 that couples various computing device components including the computing device memory 515, such as read only memory (ROM) 520 and random access memory (RAM) 525, to the processor 510.

The computing device architecture 500 can include a cache of high-speed memory connected directly with, in close proximity to, or integrated as part of the processor 510. The computing device architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other computing device memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the processor design. The processor 510 may be a self-contained system, containing multiple cores or processors, a bus, memory controller, cache, etc. A multi-core processor may be symmetric or asymmetric.

To enable user interaction with the computing device architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. The communications interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. The storage device 530 can include services 532, 534, 536 for controlling the processor 510. Other hardware or software modules are contemplated. The storage device 530 can be connected to the computing device connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks including devices, device components, steps or routines in a method embodied in software, or combinations of hardware and software.

The present disclosure provides a proposed BFD low bandwidth implementation which can reduce the BFD overhead buy as much as 50% which would provide a large gain for SDWAN (software-defined networking in a wide-area network) customers.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, at a home network in communication with a user equipment, an indication that a user of the user equipment desires to connect to a standalone non-public network for an event;
   receiving, at the home network and from the standalone non-public network, service hosting information for the event;
   revising a user equipment route selection policy at the home network based on the service hosting information to yield an updated user equipment route selection policy; and
   transmitting the updated user equipment route selection policy to the user equipment, wherein the user equipment registers, based on the updated user equipment route selection policy, with the standalone non-public network for the event.

2. The method of claim 1, wherein the event comprises one or more of a location and a time frame.

3. The method of claim 2, wherein the user equipment registers with the standalone non-public network only during the time frame of the event.

4. The method of claim 1, wherein the method further comprises:
   maintaining the communication with the user equipment in a dual-connectivity mode; and
   disconnecting with the user equipment during the event in a non-dual connectivity mode.

5. The method of claim 1, wherein the updated user equipment route selection policy comprises a dual-connectivity flag indicating whether the user equipment can simultaneously connect with the home network and the standalone non-public network during the event or whether the user equipment exclusively connects to the standalone non-public network during the event.

6. The method of claim 1, wherein an agreement is in place between a content provider associated with the standalone non-public network and the home network.

7. The method of claim 1, wherein the indication that the user of the user equipment desires to connect to the standalone non-public network for the event comprises the user initiating an application on the user equipment associated with the event.

8. The method of claim 7, further comprising:
   after receiving the indication at the home network, receiving event details from a content provider associated with the event; and
   transmitting the event details to the user equipment.

9. The method of claim 8, wherein transmitting the event details to the user equipment further comprises transmitting a message to the user equipment.

10. The method of claim 9, wherein the message enables the user to access a portal to enable the user to access the event.

11. The method of claim 10, wherein after the user accesses the portal and registers for the event, the method comprises:
    receiving the service hosting information for the event.

12. The method of claim 11, wherein after transmitting the updated user equipment route selection policy to the user equipment, the user can start an application associated with the event on the user equipment, which causes the user equipment to register with the standalone non-public network for the event based on the updated user equipment route selection policy.

13. The method of claim 1, wherein the user equipment registers, based on the updated user equipment route selection policy, with the standalone non-public network for the event for one or more of a duration of time associated with the event, while the user equipment is at a location associated with the event and/or while the user is using an application on the user equipment associated with the event.

14. A method comprising:
    transmitting, to a home network in communication with a user equipment, an indication that a user of the user equipment desires to connect to a standalone non-public network for an event, wherein the home equipment receives, from the standalone non-public network, service hosting information for the event and revises a user equipment route selection policy at the home network based on the service hosting information to yield an updated user equipment route selection policy;
    receiving the updated user equipment route selection policy at the user equipment; and
    registering, based on the updated user equipment route selection policy, the user equipment with standalone non-public network for the event.

15. The method of claim 14, wherein the user equipment registers, based on the updated user equipment route selection policy, with the standalone non-public network for the event for one or more of a duration of time associated with the event, while the user equipment is at a location associated with the event and/or while the user is using an application on the user equipment associated with the event.

16. The method of claim 14, wherein the registering, based on the updated user equipment route selection policy, of the user equipment with standalone non-public network for the event occurs in a dual-connectivity mode in which the user equipment maintains a connection with the home network during the event or a non-dual-connectivity mode in which the user equipment does not maintain a connection with the home network during the event.

17. The method of claim 14, wherein after the event, the method comprises:
    deregistering the user equipment from the standalone non-public network.

18. A method comprising:
    transmitting service hosting information from a standalone non-public network and to a home network in communication with a user equipment for an event, wherein the transmitting of the service hosting information is based on an indication that a user of the user equipment desires to connect to the standalone non-public network for the event and wherein the home network revises a user equipment route selection policy based on the service hosting information received from the standalone non-public network to yield an updated user equipment route selection policy and transmits the updated user equipment route selection policy to the user equipment;

receiving, based on the updated user equipment route selection policy, a registration of the user equipment with the standalone non-public network for the event; and providing access to the event to the user equipment according to the updated user equipment route selection policy.

19. The method of claim 18, wherein providing the access to the event occurs based on one or more of while the user is using an application on the user equipment associated with the event, for a time frame associated with the event and based on a location of the user equipment in connection with the event.

20. The method of claim 18, wherein providing access to the event to the user equipment according to the updated user equipment route selection policy occurs in a dual-connectivity mode in which the user equipment maintains a connection with the home network during the event or a non-dual-connectivity mode in which the user equipment does not maintain a connection with the home network during the event.

21. The method of claim 18, further comprising: deregistering the user equipment after the event.

22. A mobile device comprising:
a processor; and
a computer-readable storage device, storing instructions which, when executed by the processor, cause the processor to perform operations comprising:
transmitting, to a home network in communication with the mobile device, an indication that a user of the mobile device desires to connect to a standalone non-public network for an event, wherein the home equipment receives, from the standalone non-public network, service hosting information for the event and revises a route selection policy at the home network based on the service hosting information to yield an updated route selection policy;
receiving the updated route selection policy at the mobile device; and
registering, based on the updated route selection policy, the mobile device with standalone non-public network for the event.

* * * * *